PAUL TIMOFEEFF, OF ST. PETERSBURG, RUSSIA.

FIREPROOF BUILDING-CEMENT.

No. 878,912.

Specification of Letters Patent.

Patented Feb. 11, 1908.

Application filed August 14, 1906. Serial No. 330,590.

To all whom it may concern:

Be it known that I, PAUL TIMOFEEFF, a subject of the Emperor of Russia, residing at St. Petersburg, Russia, have invented certain new and useful Improvements in Fireproof Building-Cements, of which the following is a specification.

My novel fire-proof cement consists of sulfate of calcium in combination with carbonate of calcium mixed in a certain proportion, heated at a temperature of 150° C. and ground into fine powder. The natural sulfate may also be used or the sulfate of calcium may be artificially prepared from lime such as, tuff, chalk and other lime found in nature and sulfuric acid. These substances are heated in furnaces or, when sulfuric acid is used boiled in suitable vessels at 130° C. until all the water has passed off. The resulting product is finally ground.

In order to impart hydraulic properties to the cement I add volcanic tuff which consists of silicates of aluminium, this may also be obtained by the action of heat on silicious alumina. Pozzolana or trass may also be added or similar substances artificially obtained by calcining clays and furnace slags.

In manufacturing fire-proof cement for aerial and decorative purposes the hydraulic substances may be omitted. For special applications I may add powdered silicious mortar, dextrin, casein or fluor spar etc., which impart certain properties for special purposes.

The cement forming the subject matter of this invention is white in color; when mixed with water quickly or slowly it becomes hard in the air or under water. The cement is not affected by acids of alkalies and boiling water. It is so refractory that fire will not destroy it. Changes of temperature and atmospheric influences have no effect on it. The additions of the substances for special applications vary from 2 to 10 per cent. of the weight of the cement. Likewise I may add rye or other vegetable flour to the cement for the purpose of retarding the taking up in interior work.

The fire-proof building cement may be applied in thick layers with a trowel or it may be applied in thin layers like paint with a brush to wood, metal, stone and the like. It adheres firmly without cracking and protects the coated surfaces. Wood becomes fire-proof when coated therewith and steel and iron will not rust but will withstand the action of fire. The novel cement is adapted to replace the binding materials used in the art of building such as Portland cement, Romansky slag, sand cement, mortar, plaster paris, etc. Owing to its property to stick firmly to surfaces of wood and metal the cement may be used on roofs and in ship building. The cement is fire-proof to the highest degree and therefore may be used as fire-proof coverings and may be colored for that purpose.

The proportions in which the substances are mixed vary in accordance with the purpose and use of the cement. One cement consisting of 24 parts of anhydrous sulfate of calcium and 6 parts of calcined clay which forms the basic mass and one part each of dextrin and silicious mortar gives a tensile strength with normal sand, one part of cement to 3 parts of sand 28 days after mixing up to 50.6 kilograms per square c. m. and without sand up to 54.4 kilograms per square c. m., as regards crushing; with sand mixed in up to 175 kilograms per square c. m. and without sand up to 225 kilograms per square c. m.. These results can not be obtained with the best standards of all Russian and foreign Portland cements. In the course of time it increases considerably in strength.

The new cement binds also very well with chalk, asbestos, and chamotte for fire-proof roofs, with infusorial earth for coverings for steam pipes, and rubble, cork, tuff, and sawdust, which are poor conductors of heat and cold. These substances are also thoroughly mixed with cement before water is added. It is advantageous to batter the cement when spreading it to obtain more strength. The new cement being white in color and of low specific gravity mixes easily with paints whereby cement masses are obtained which are uniformly colored throughout. For black cement, lamp black, and soot may be added; red lead and vermillion gives red cement, chrome oxid an orange color; Schweinfurt green and green ultramarine produces green cement and so forth. When sulfate of barium is added the natural white color of the cement is intensified. These colored cements are produced by adding the paints to the dry cement powder in the desired quantity. After both have been thoroughly mixed water is added.

The colored cements may be used as paints for coating wooden, metal and stone surfaces. For cementing objects together and as a putty it may be used to advantage both white as well as colored.

The cement is an excellent material for making artificial stone and may be used in iron concrete work. In the petroleum fields it may be used for covering the overhead work of wells and for stopping the flow of water in sinking petroleum pipes.

Having thus described my invention I claim as new and desire to secure by Letters Patent.

1. The composition for a refractory building cement consisting of dehydrated finely powered anhydrous sulfate of calcium, finely powered corbornate of calcium, and silicious volcanic tuff imparting hydraulic properties.

2. A composition for refractory building cement consisting of 24 parts of finely powdered anhydrous sulfate of calcium and 6 parts of dehydrated calcium carbonate in powdered form, and some silicious volcanic tuff imparting hydraulic properties.

3. The composition for a refractory building cement consisting of dehydrated finely powdered anhydrous sulfate of calcium, finely powdered corbonate of calcium, volcanic substances imparting hydraulic properties, and mineral colors.

4. As a refractory building cement a composition derived from dehydrated finely powdered anhydrous sulfate of calcium, finely powdered carbornate of calcium, and silicious volcanic substances in powdered form imparting hydraulic properties.

5. As a refractory building cement a composition derived from 24 parts of finely powdered sulfate of calcium, 6 parts dehydrated finely powdered carbonate of calcium, one part of silicious volcanic substance, and one part of dextrin.

6. As a refractory building cement a composition derived from dehydrated finely powdered anhydrous sulfate of calcium, finely powdered carbonate of calcium, volcanic substances in powdered form, and mineral colors.

In testimony whereof, I have signed my name to this specification in the presence of two subscribing witnesses.

PAUL TIMOFEEFF.

Witnesses:
H. A. LOVIAGUINE,
A. WANSCHEIDT.